April 23, 1935.  F. N. HVEEM  1,998,722
STABILOMETER
Filed Jan. 18, 1933  2 Sheets-Sheet 1

INVENTOR.
Francis N. Hveem,
BY Townsend & Loftus
ATTORNEYS.

April 23, 1935.  F. N. HVEEM  1,998,722
STABILOMETER
Filed Jan. 18, 1933  2 Sheets-Sheet 2

INVENTOR.
Francis N. Hveem.
BY Townsend & Loftus
ATTORNEYS.

Patented Apr. 23, 1935

1,998,722

UNITED STATES PATENT OFFICE 1,998,722

STABILOMETER

Francis N. Hveem, Sacramento, Calif.

Application January 18, 1933, Serial No. 652,277

2 Claims. (Cl. 265—14)

This invention relates to apparatus for testing the stability of plastic and semi-plastic materials, such as bituminous paving mixtures.

It is the principal object of the present invention to provide an improved apparatus for testing plastic materials, by means of which bituminous paving mixtures or like materials may be subjected to stresses similar in magnitude and direction to those occurring in pavements under traffic, and enable determination of the resistance of the material to distortion under various load conditions.

In carrying the invention into practice, I have provided a shell having a pressure chamber wherein a liquid may be confined. The inner wall of this chamber is yielding. A specimen of the material to be tested is positioned interiorly of the shell with its sides in intimate contact with the yielding wall of the pressure chamber. A varying load is then impressed on the specimen and the resistance of the material to the pressure can be determined by the pressure created by deformation of the specimen in a direction perpendicular to the applied load.

The invention is exemplified in the following description and an apparatus for practicing the invention is illustrated by way of example in the accompanying drawings, in which.

Referring more particularly to the accompanying drawings, 10 indicates a cylindrical shell of appropriate dimensions and design. Formed integral with the shell interiorly thereof and adjacent its opposite ends are two inturned annular flanges 11 and 12. The inner periphery of these flanges are oppositely tapered as illustrated most clearly in Fig. 2.

Arranged interiorly of the shell and concentric with relation thereto is a flexible cylinder 14 preferably formed of rubber but which may be formed of any other suitable yielding material. The exterior diameter of this flexible cylinder 14 coincides with the internal diameters of the flanges 11 and 12 and the ends of the cylinder are secured to the inner peripheries of these flanges.

Figure 4:
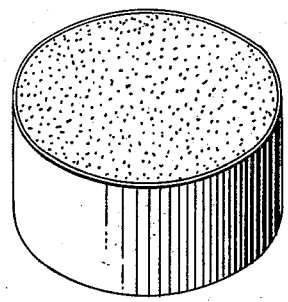
Fig. 4 is a perspective view of the form of specimen employed for testing.
Figure 5:
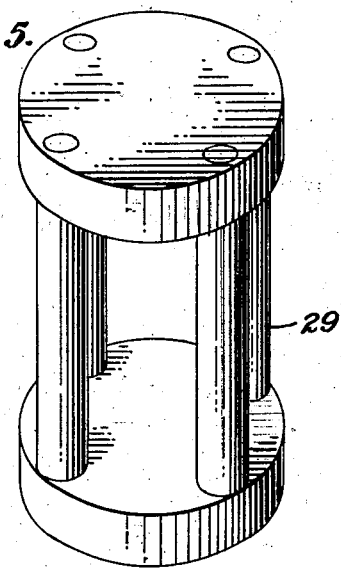
Fig. 5 is a perspective view of the cage type follower used in connection with the apparatus.
Figure 1:
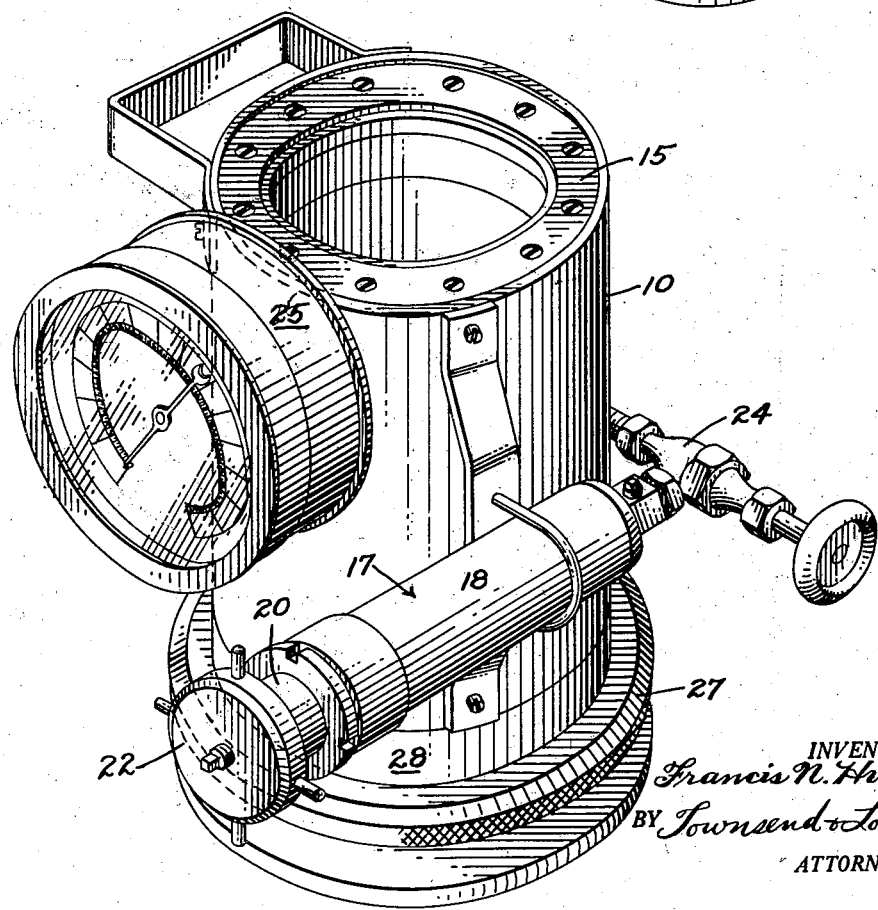
Fig. 1 is a perspective view of an apparatus for practicing my invention.
Figure 2:
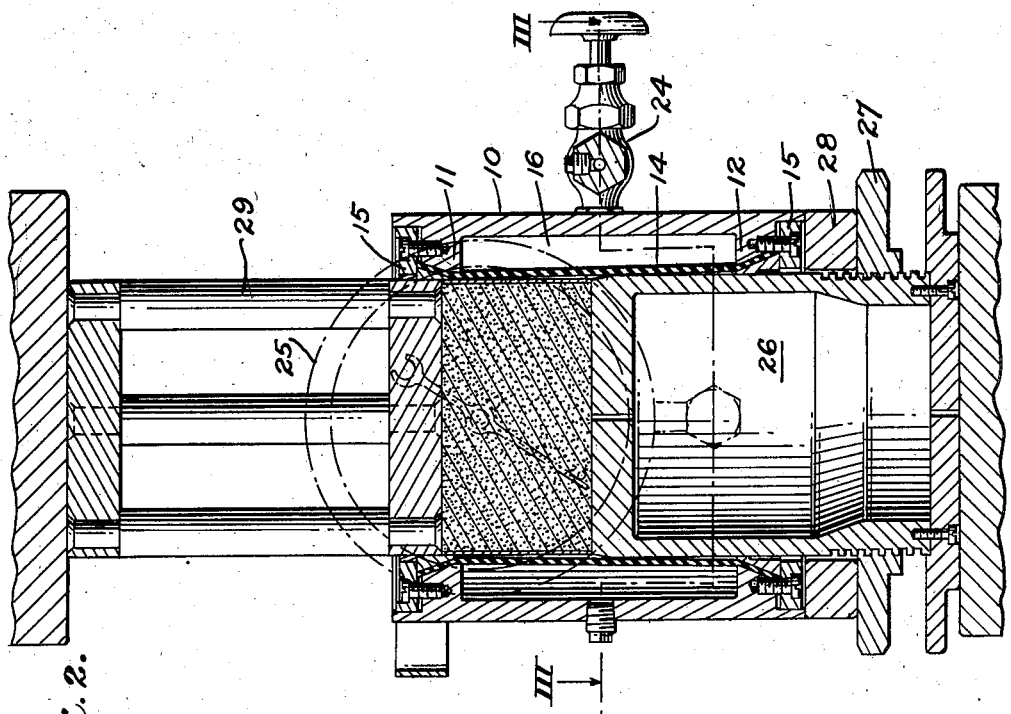
Fig. 2 is a central vertical section through the same.
Figure 3:
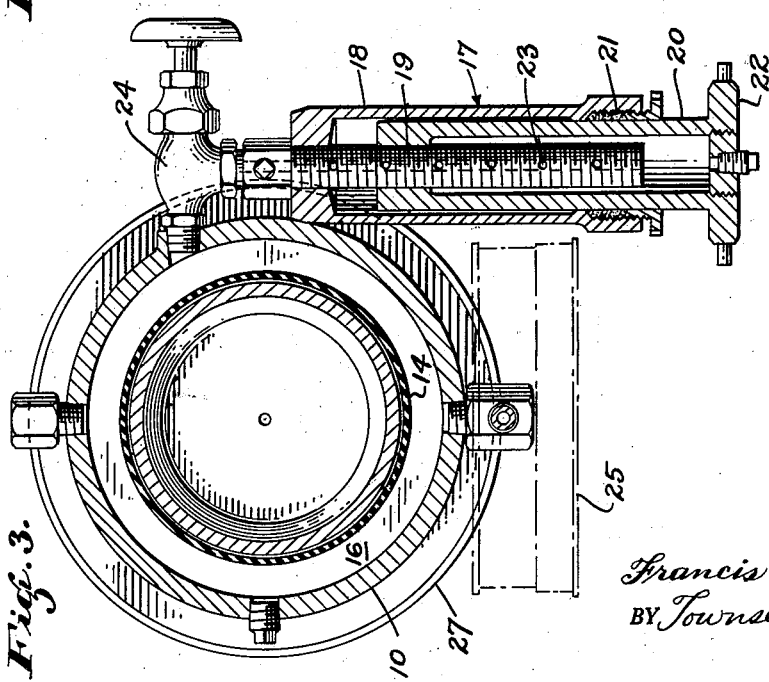
Fig. 3 is a plan section through the apparatus taken on line III—III of Fig. 2.

By reference to Fig. 2 it will be noticed that clamping rings 15 are provided which are secured to the flanges and which act to clamp the opposite ends of the flexible cylinder 14 to the inner peripheries of the flanges in a manner forming a fluid-tight union therebetween.

By this mounting of the flexible cylinder 14 in the shell 10 a pressure chamber 16 is formed intermediate the flexible cylinder 14 and the shell 10, the ends of which chamber being defined by the flanges 11 and 12. It is intended that this chamber contain fluid under pressure and to supply this fluid under pressure I have provided a displacement type pump 17 which may be supported by the shell exteriorly thereof in any suitable manner.

This displacement pump comprises a stationary cylinder 18 having a fixed threaded mandrel 19 arranged coaxially thereof. A piston 20 is reciprocably mounted in the cylinder 18 and is threaded on the fixed threaded mandrel 19 so that by rotation of the piston 20 it may be reciprocated in the cylinder 18. It will be noticed that one end of the piston projects through the open end of the cylinder 18 at which point packing means 21 is provided to prevent leakage. At its outer end the piston 20 is provided with a suitable hand wheel 22 by means of which it may be rotated in either direction to advance or retract it in the cylinder 18.

The mandrel 19 is hollow and it is formed with a series of radial ports 23 which communicate with its interior. Also, communicating with the interior of the mandrel 19 is an angle valve 24, the discharge port of which communicates with the pressure chamber 16 in the shell 10. This angle valve, of course, controls the injection of fluid into the pressure chamber 16 or the withdrawal of the fluid therefrom.

Also, mounted on the shell is a gauge 25 for accurately measuring hydraulic pressures built up in the pressure chamber 16. This gauge is calibrated to approximately 200 pounds and it is so associated with the pressure chamber 16 that it will accurately indicate pressures built up therein.

I have also provided what I prefer to term a plunger 26 which is of an exterior diameter enabling it to be snugly inserted into the lower end of the shell. This plunger is of a diameter closely coinciding with the interior diameter of the flexible cylinder 14. Adjacent its lower end this plunger is exteriorly threaded to receive an adjustable abutment collar 27. Spacer elements 28 may be arranged between this adjustable abutment collar 27 and the lower end of the shell so that the plunger 26 may be projected within the shell a desired amount.

In operation of the device, it is constructed and assembled as illustrated in the drawings and a test specimen is made from the plastic material to be tested. This specimen is preferably in brickette form either artificially prepared or cut from the pavement by means of a coring machine. I prefer that the specimen be enclosed within a paper or other yielding wrapper so as to maintain the material out of contact with the flexible cylinder. The diameter of the specimen is made to agree substantially with the internal diameter of the flexible cylinder 14. The thickness of the specimen may vary inasmuch as the amount which the plunger 26 projects into the shell is adjustable.

The entire apparatus is then placed on a testing press of either the beam or hydraulic type. In the present instance I have illustrated a follower 29 of the cage type as being inserted into the upper end of the cylinder and abutting against the upper end of the specimen therein. The test load may be applied at any desired speed but I prefer a head speed of .05 inches per minute.

Prior to placing of the load onto the specimen the angle valve 24 is opened and the displacement pump 17 is operated to force liquid from the pump into the pressure chamber until the pressure gauge 25 indicates a pressure of say five pounds per square inch as the uniform basis for starting the test. The angle valve 24 is then closed. The load is then applied to the specimen and any resulting pressure passing through the specimen at right angles to the direction of the test load is transmitted to the flexible cylinder or the yielding internal wall of the pressure chamber and will be indicated by the pressure gauge 25.

Under these conditions a liquid specimen would transmit pressure per unit area equivalent to the applied load per unit area. An absolute solid would, of course, transmit no pressure. Therefore, plastics or semi-solids will range in value between these two limits. The test results may be interpreted in various ways, as for instance, the rate of transmitted pressure to applied pressure, or referring to an arbitrary scale in which zero would equal liquid and one hundred per cent a rigid solid.

With the present apparatus tests can be made with various sorts of reasonably stiff plastic materials, such as clay, soil (to determine bearing values), waxes, workability of concrete, etc. Likewise, the apparatus may be used to measure the stability of aggregates either with or without asphaltic binder.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. An apparatus of the character described comprising a cylindrical shell, a flexible cylinder arranged concentrically within the shell, and forming thereby a pressure chamber intermediate said cylinder and the shell, said cylinder being adapted to receive a specimen to be tested and permitting pressure to be applied to said specimen in a direction coaxially of said cylinder, and indicating means influenced by changes in pressure in said chamber to indicate deformation of the specimen in a direction perpendicular to the direction of pressure applied to said specimen.

2. An apparatus of the character described comprising a cylindrical shell, a flexible cylinder arranged concentrically within the shell, and forming thereby a pressure chamber intermediate said cylinder and the shell, said cylinder being adapted to receive a specimen to be tested and permitting pressure to be applied to said specimen in a direction coaxially of said cylinder, means for creating a predetermined initial pressure in said chamber, and indicating means indicating changes in pressure in said chamber to enable measurement of the deformation of the specimen when the same is deformed in a direction perpendicular to the direction of the applied pressure, which deformation increases the pressure in the chamber.

FRANCIS N. HVEEM.